United States Patent
Dobbins et al.

(10) Patent No.: US 7,743,166 B2
(45) Date of Patent: Jun. 22, 2010

(54) SCALEABLE FLOW-BASED APPLICATION AND SUBSCRIBER TRAFFIC CONTROL

(75) Inventors: Kurt A. Dobbins, Bedford, NH (US); Brett A. Miller, Northborough, MA (US); Bruce E. Caram, Hudson, MA (US)

(73) Assignee: Ellacoya Networks, Inc., Chelmsford, MA (US)

( * ) Notice: Subject to any disclaimer, the term of this patent is extended or adjusted under 35 U.S.C. 154(b) by 1116 days.

(21) Appl. No.: 10/673,999

(22) Filed: Sep. 30, 2003

(65) Prior Publication Data

US 2005/0005023 A1    Jan. 6, 2005

Related U.S. Application Data

(60) Provisional application No. 60/460,045, filed on Apr. 4, 2003, provisional application No. 60/460,046, filed on Apr. 4, 2003.

(51) Int. Cl.
*G06F 15/16* (2006.01)

(52) U.S. Cl. .................. 709/238; 709/203; 709/223; 709/224; 709/228; 709/232; 370/392; 370/235; 370/389

(58) Field of Classification Search ........... 709/203, 709/223, 224, 228, 232, 238; 370/389, 391, 370/392, 409, 395.21, 466, 474, 476, 477, 370/229, 235
See application file for complete search history.

(56) References Cited

U.S. PATENT DOCUMENTS

| | | | |
|---|---|---|---|
| 6,006,264 A | 12/1999 | Colby et al. | |
| 6,073,175 A | 6/2000 | Tavs et al. | |
| 6,757,283 B1 | 6/2004 | Yamanaka et al. | |
| 6,760,769 B2 | 7/2004 | Jayam | |
| 6,788,683 B1 * | 9/2004 | Ikeda et al. | 370/389 |
| 6,944,169 B1 * | 9/2005 | Yoshizawa et al. | 370/410 |
| 7,016,956 B2 | 3/2006 | Dobbins et al. | |
| 7,209,977 B2 | 4/2007 | Acharya et al. | |
| 2002/0002543 A1 | 1/2002 | Spooren et al. | |
| 2002/0029260 A1 | 3/2002 | Dobbins et al. | |
| 2002/0034187 A1 * | 3/2002 | Kalkunte et al. | 370/401 |
| 2002/0059120 A1 | 5/2002 | Milton | |
| 2002/0099842 A1 | 7/2002 | Jennings et al. | |

(Continued)

OTHER PUBLICATIONS

"The E-Music Trap", Laura Rohde and Marc Ferranti, InfoWorld, Aug. 18, 2000.

(Continued)

*Primary Examiner*—Ario Etienne
*Assistant Examiner*—Barbara N Burgess
(74) *Attorney, Agent, or Firm*—Houston Eliseeva LLP

(57) ABSTRACT

Methods and systems for providing scaleable flow based application control in private and public Internet. A flow table can be used to control the application and subscriber traffic for communication flows in access networks. The flow table entry can provide granular, unidirectional packet transmission of data for all or a subset of all host and application communications originating from or destined to network hosts in the access network. Using a flow table entry for multiple unidirectional packet transmissions of data provides efficient use of flow table entries and allows varying operator control of application communication exchanges between network hosts and applications. By using variable masking techniques, the flow table can be used for varying degrees of control over the packet transmissions in the network.

11 Claims, 7 Drawing Sheets

U.S. PATENT DOCUMENTS

| | | | |
|---|---|---|---|
| 2003/0043802 A1* | 3/2003 | Yazaki et al. | 370/389 |
| 2003/0123393 A1 | 7/2003 | Feuerstraeter et al. | |
| 2003/0135863 A1 | 7/2003 | Van Der Schaar | |
| 2003/0174718 A1* | 9/2003 | Sampath et al. | 370/401 |
| 2003/0189932 A1* | 10/2003 | Ishikawa et al. | 370/392 |
| 2003/0200439 A1 | 10/2003 | Moskowitz | |
| 2007/0079005 A1 | 4/2007 | Jasen et al. | |
| 2008/0037546 A1* | 2/2008 | Ishikawa et al. | 370/392 |

OTHER PUBLICATIONS

Ethernet Autonegotiation Best Practices, Jim Eggers et al., Sun BluePrints OnLine—Jul. 2004.

Flynn, Roger R. Computer Sciences, Encyclopedia entry- "minitel" Macmillan Reference, 2002, pp. 142-145.

The French Videotex System Minitel: A Successful Implementation of a National Information Technology Infrastructure, Cats-Baril, William and Tawfik Jelassi, MIS Quarterly, Mar. 1994, pp. 1, 10, 11.

"FairShare anti-piracy", posting from Halfbakery.com.

* cited by examiner

| | In I/F | Src IP | Dst IP | Src App | Dst App | Out I/F | Action | Service |
|---|---|---|---|---|---|---|---|---|
| 2080 | 1 | 171.12.16.1 | 192.168.1.1 | TCP:80 | TCP:80 | 2 | Allow | ProfileN |
| 2090 | 2 | 192.168.1.1 | 171.12.16.1 | TCP:80 | TCP:80 | 1 | Allow | ProfileN |
| 2000 | 1 | 171.12.16.1 | 192.168.1.2 | TCP:80 | TCP:80 | 2 | Allow | Profile1 |
| 2110 | 2 | 192.168.1.2 | 171.12.16.1 | TCP:80 | TCP:80 | 1 | Allow | Profile1 |
| 2120 | 1 | 171.12.16.1 | 192.168.1.3 | TCP:80 | TCP:80 | 2 | Allow | Profile1 |
| 2130 | 2 | 192.168.1.3 | 171.12.16.1 | TCP:80 | TCP:80 | 1 | Allow | Profile1 |
| 2140 | 1 | 171.12.16.1 | 192.168.1.4 | TCP:80 | TCP:80 | 2 | Allow | Profile1 |
| 2150 | 2 | 192.168.1.4 | 171.12.16.1 | TCP:80 | TCP:80 | 1 | Allow | Profile1 |
| 2160 | 1 | 171.12.16.1 | 192.168.1.5 | TCP:80 | TCP:80 | 2 | Deny | |
| 2170 | 2 | 192.168.1.5 | 171.12.16.1 | TCP:80 | TCP:80 | 1 | Deny | |

Column labels: 2010, 2020, 2030, 2040, 2050, 2060, 2070, 2075

Figure 3

| Address | Granularity Mask | Result for Flow Key Address |
|---|---|---|
| 171.12.16.1 | FF.FF.FF.0 | 171.12.16.0 |
| 192.168.0.0 | 0.0.0.0 | 0.0.0.0 |
| 7.8.9.10 | FF.FF.FF.FF | 7.8.9.10 |
| 0.0.0.0 | 0.0.0.0 | 0.0.0.0 |

| Application Port | Granularity Mask | Result for Flow Key Application Port |
|---|---|---|
| TCP:0080 | 00FF | TCP:0080 |
| TCP:0000 | 0000 | TCP:0000 |

| | In I/F | Src IP | Dst IP | Src App | Dst App | Out I/F | Action | Service |
|---|---|---|---|---|---|---|---|---|
| | 5010 | 5020 | 5030 | 5040 | 5050 | 5060 | 5070 | 5080 |
| 5080 | 1 | 171.12.16.0 | 0.0.0.0 | 0 | TCP:80 | 2 | Allow | ProfileN |
| 5090 | 2 | 0.0.0.0 | 171.12.16.0 | TCP:80 | 0 | 1 | Allow | ProfileM |
| 5100 | 1 | 0.0.0.0 | 0.0.0.0 | 0 | 0 | 2 | Deny | Log |
| 5110 | 2 | 0.0.0.0 | 0.0.0.0 | 0 | 0 | 1 | Deny | Log |

SCALEABLE FLOW-BASED APPLICATION AND SUBSCRIBER TRAFFIC CONTROL

This application claims priority from U.S. Provisional Patent Application Ser. No. 60/460,045 of Kurt A. DOBBINS et al., filed Apr. 4, 2003, titled METHOD AND APPARATUS FOR OFFERING TAGGED CONTENT PREFERRED TRANSPORT WITHIN A BROADBAND SUBSCRIBER NETWORK; and U.S. Provisional Patent Application Ser. No. 60/460,046 of Kurt A. DOBBINS et al., filed Apr. 4, 2003, titled METHOD AND APPARATUS FOR CHARGING AND AGGREGATING ONLINE TRANSACTIONS THROUGH BROADBAND CARRIER BILLS. The entireties of those provisional applications are incorporated herein by reference.

BACKGROUND

1. Field of the Invention

The present invention relates to a method and apparatus for application control in private and public Internet, and more particularly, to a method and apparatus of providing scaleable flow based application control in private and public Internet.

2. Description of Related Art

Private and public Internets are interconnected with communication nodes that route packets from a source network host to a destination network host. Packets are a whole or a portion of a transmission between two host nodes, with each node having a unique network address. The Internet is made up of a variety of different networks, each assigned a unique network identifier. The network address is hierarchical in that it is made up of a network identifier, a sub network identifier, and a host identifier. Communication nodes called routers use the network portion of the address to make routing decisions at the points where networks are interconnected. This allows networks to be interconnected without communication nodes having to know the details of all the sub networks and networks hosts inside a destination network. However, within a destination network, a router would need to know the sub networks that are with its network and then subsequently within a sub network a router would need to be able to resolve all of the addresses for network hosts directly connected within the subnet. This hierarchy is analogous to the hierarchy of addresses when routing a telephone call in a circuit switched network: the county and area codes are used to aggregate the routing and addressing for all of the handsets within an area.

Because of the network addressing hierarchy, routers end up being very efficient in scaling the number of hosts that can connect to the Internet because they rely on the network identifiers only. However, in the access network where network hosts attach to the Internet, service providers increasingly want to provide "granular" services in which individual subscribers and applications can be differentiated from the "best effort" services provided on the Internet. One of the ways service providers are providing granular services is with flow-based network appliances.

However, because of the vast number of hosts that can connect to the Internet, in comparison with the number of networks that can connect, flow-based appliances cannot scale and aggregate Internet traffic they way Internet routers can if all communications are treated as flows.

In addition, each flow setup could experience significant latency in comparison to the latency once a flow is established because of the complex logic applied to the first instance of communication exchange and creating a flow entry in a lookup table.

Lastly, because flows are set up on each communication exchange between applications on network hosts, flow-based appliances can be susceptible to denial of service attacks simply by having a network host generate a new communication exchange to a network destination address or communications port, causing a flow-entry to be created for each exchange. Network service attacks can take many forms, including IP address sweeps, port scans, worms and email viruses. In an IP address sweep, the attacker attempts connections with many IP addresses on a particular TCP or UDP port. In a port scan, the attacker targets a specific machine and tries to initiate connections on hundreds or thousands of ports looking for a point of entry.

There is a need in the art for a flow-based appliance that can provide both the scale necessary to interconnect Internet hosts and the granularity required to provide differentiated services, for example, on a per-subscriber or per-application basis.

SUMMARY OF THE INVENTION

In one aspect, the invention relates to a method for transmitting data according to a flow table, a flow key, and one or more variables. The method includes masking the flow key according to the one or more variables and indexing the flow table with reference to the masked flow key. The method further includes looking up a flow entry in the indexed flow table and transmitting data according to the flow entry.

It is an object of the present invention to create a flow-based appliance that can provide both the scale necessary to interconnect Internet hosts and the granularity required to provide differentiated services on a per-subscriber and per-application basis.

It is a further object of the invention to enable service providers to provide granular services under policy control. Policy control means that operators can specify which applications and which subscribers are to get the differentiated services enabled by a flow-based appliance.

A further object of the invention is to allow service providers the ability to provide bulk Internet services in combination with highly granular application specific services and to offer this combination to individual subscribers or groups of subscribers.

A further object of the invention is to allow service providers to report on application usage by individual subscribers, individual subnets, or individual networks connected to the Internet.

A further object of the invention is to provide policy-based access control by individual subscribers, individual subnets, or individual networks connected to the Internet.

Yet another object of the invention is to provide policy-based bandwidth and Quality of Service (QoS) by individual subscribers, individual subnets, or individual networks connected to the Internet.

A further object of the invention is to prevent denial of service attacks with network address scans or communication port scans.

A further object of the invention is to improve the efficiency and latency of establishing an application communication exchange between network hosts with a flow-based appliance.

Yet another object of the invention is to enable placements of flow-based appliances anywhere in the service provider network that a router would typically be installed. In one embodiment, this includes a placement at the access edge of the network, either in a modem, its termination system, an aggregation point where many termination systems are connected, or in a point of presence where core routers interconnect networks on the Internet.

These and other features of the invention will become apparent from the following detailed description of the invention with reference to the attached drawings, wherein:

BRIEF DESCRIPTION OF THE DRAWINGS

FIG. 2 is an example of a flow entry table without masking.

FIG. 3 is an example of an address mask table.

FIG. 4 is an example of an application port mask table.

FIG. 5 is an example of a flow table with masking.

DETAILED DESCRIPTION OF THE INVENTION

Figure 1:
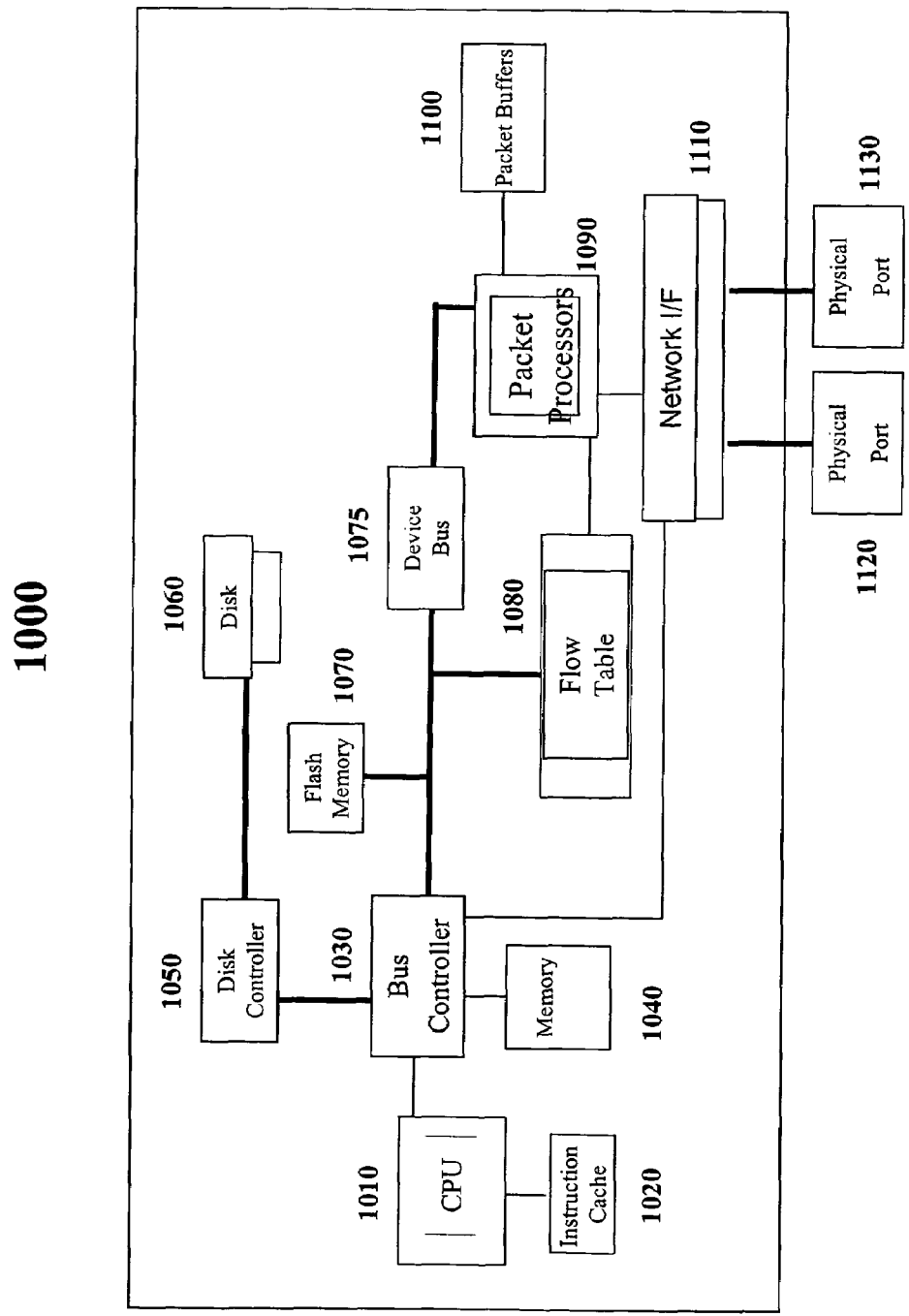
FIG. 1 is a block diagram of a system for providing scaleable flow-based application and subscriber traffic control.

In one embodiment of the present invention, these and other objects and advantages are achieved by scaleable flow-based application and subscriber traffic control in accordance with the present invention. In one embodiment, a service provider establishes a service offer for differentiated application and subscriber services using scaleable flow-based network appliance connecting network termination equipment and Internet routers. The service provider selects the range of subscribers to which the service will be offered, which encompasses one or more network hosts and sub networks. The service provider than selects the network application to be given differentiated and granular service. The service provider may initially select an application and subscriber range for reporting usage only in an effort to determine the popularity of certain applications in each market the service provider serves.

In one embodiment, the service provider configures the scaleable flow-based network appliance for both the granular application and subscriber services as well as the bulk Internet services.

In one embodiment of the present invention, upon packet reception, the scaleable flow-based appliance examines the packet and extracts source and destination network addresses as well as source and destination application communication ports. Using internal tables, it then applies a bit-mask to each of these attributes to get resulting values. The bit-mask will indicate which bit values to mask on and off prior to forming the flow key or creating a flow table entry.

Masking bits OFF for each selected attribute used in forming the flow key prior to actually forming a flow-key for lookup has the overall effect of aggregating what would have been multiple flow entries into a single flow entry in the flow table. This allows a single flow entry to be used for multiple subscribers and application communication ports. Masking bits ON for each attribute forming a flow-key for lookup has the overall effect of creating a flow-entry with more granularity of the application communication and/or the subscriber network host addresses.

In the extreme case of a service provider providing bulk Internet services with no granularity, masks could be configured in such as way as to have the resulting values for the network addresses and application communication ports to become all zeros. A single flow entry whose lookup key was all zeros would control the communication exchanges between all subscribers and all network hosts on the Internet.

The resulting scale is that a single flow entry can control the Internet communications exchange between all network hosts. Any combination of masking flow attributes is envisioned, allowing the service provider to vary the service offerings simply by selectively varying the combination of source and destination networks along with the source and destination application ports. A service provider can provide certain service to a particular destination on the Internet, or from a particular source, or for a particular application, or for any combination of these concurrently. For example, a service provider will select a particular application for granular control over a range of subscribers. By configuring a sub network mask for a subscriber group, a service provider can provide granular application control over a specific group of subscribers while providing bulk Internet service for the rest of the subscribers and applications not impacted by the mask value.

In accordance with the present invention, a service provider could provide best effort Internet services for all subscribers and in addition provide a new application service for music downloads to only those subscribers that have subscribed to the music service. This combines the flow entry aggregation for all traffic other than the music download application.

In accordance with the present invention, a service provider could provide bandwidth and quality of service along with the granular and bulk application service offerings. A flow entry associates the communication attributes for any communication exchanges matching the flow key for a particular entry. For example, a service provider could offer an Internet service at 128 Kbps for all subscribers and then offer the music download service at 1 Mbps.

In accordance with the present invention, a service provider could provide different application services to different markets by combining application granularity with sub networks, where sub networks could represent a different geographic location in the service providers network. For example, if a service provider has a sub network servicing a university campus, a music download application would be appropriate, whereas in commercial markets with different subnets, a video conferencing application may be appropriate.

In accordance with an embodiment of the present invention, a service provider could offer a granular application service to individual subscribers whereas each subscriber has bulk Internet service and in addition may have a specific application, such as, for example, gaming.

In accordance with an embodiment of the present invention, a service provider could deny application communication services for specific applications for any range of subscribers. For example, all applications except web and email could be denied if a service provider wanted to offer an entry-level service plan. As subscribers join and select additional services, the service provider can simply change the masked value configuration and provide new application services.

A so-called "flow based" appliance can include flow-based switching managed by a flow table. Such a flow tables gives identity to end-to-end or source-to-destination communication exchanges. In a flow-based architecture, upon packet arrival, certain fields are extracted from the packet, and flow-based elements are used to form a unique identifier as a key into the flow table. If there is a match, then the packet is switched in process according to the service attributes of the flow table entry. Otherwise, the packet is further processed in order to establish a new flow entry in that flow table. An access network's objective in employing a flow-based subsystem is to ensure that every packet in a transmission flow is accorded the same service, and avoiding the need to asses and assign service to every individual packet. In addition, because each flow entry can control the unidirectional communication between two host applications, a service provider can use a flow-based appliance to provide very specific services on a host-by-host and application-by-application basis.

In some implementations, flow-based network appliances make routing decisions not on the aggregate network destination, but by a combination of attributes from the packet. A flow is defined, for example, as a stream of packets from an application, usually consisting of packets identified with the same source IP network address, same IP network destination address, same IP protocol (TCP or UDP for example) identifier, same source application port, and same destination application port. In one implementation, the attributes used to determine a flow are the source and the destination network host address along with application port identifiers. Each of these attributes can be used to uniquely identify an application communications exchange between two network hosts. Because all of the communications for a particular application between two hosts will result in the same attributes being used each time, a flow-based appliance will use the first instance of the communication to establish a "flow." A flow is an entry in a lookup table that uses certain attributes (interchangeably referred to as a flow key), such as, for example, the source and destination attributes, to identify how the communications exchange of packets should be handled in regards to policy, quality of service, latency, or other application or service specific qualities. The efficiency of a flow-based appliance is that these service-related decisions can me made on the first instance of the communication exchange rather than on each individual packet as in a packet-based router. In other words, complex logic can be applied once, and result in a flow-entry being established. Once a flow entry is established, subsequent packets on that particular flow no longer need to have the complex logic to determine the service attributes. In addition, using a combination of source and destination attributes from the packet to form a flow has the effect of separately identifying the application communications of every network host on the access network from the aggregate traffic of the network or subnet at large. However, because of the vast number of hosts that can connect to the Internet, in comparison with the number of networks that can connect, flow-based appliances cannot scale and aggregate Internet traffic they way Internet routers can if all communications are treated as flows.

In addition, each flow setup could experience latency in comparison to the latency once a flow is established because of the complex logic applied to the first instance of communication exchange and creating a flow entry in a lookup table.

Lastly, because flows are setup on each communication exchange between applications on network hosts, flow-based appliances can be susceptible to denial of service attacks simply by having a network host generate a new communication exchange to a network destination address or communications port causing a flow-entry to be created for each exchange. Network service attacks can take many forms, including IP address sweeps, port scans, worms and email viruses. In an IP address sweep, the attacker attempts connections with many IP addresses on a particular TCP or UDP port. In a port scan, the attacker targets a specific machine and tries to initiate connections on hundreds or thousands of ports looking for a point of entry.

FIG. 1 is a block diagram of a system for providing scaleable flow-based application and subscriber traffic control. Physical network ports 1120 and 1130 are connected to a network interface 1110 where packets can be received and transmitted with the correct framing for the transmission media. Packet processors 1090 can process each packet and make forwarding/routing/switching determinations. Those packet processors can (among other related or unrelated functions) inspect the packets, decode protocol headers, extract network and application address information, and apply logic to accept, discard, forward, queue, mark, shape, pace, rate limit, tag, count, or otherwise control the quality or rate of admission onto the network interface 1110 or to other components within an appliance 1000 for further processing or packet inspection.

For example, in some cases, a packet processor may forward packets to other components inside the switch, such as a CPU 1010 or other network processors. The CPU runs instructions, including instructions from an instruction cache 1020, that may apply still further processing or configuration of components and initializing, or loading tables or other data structures inside the appliance. The CPU can use well-known techniques for interfacing with discrete components such as a memory 1040, a flash memory 1070, a bus controller 1030, a disk controller 1050 or a disk subsystem 1060, as well as a device bus 1075 to provide control signaling and data access to addressable components.

The packet processor 1090 stores packets in a packet memory 1100 while processing packet headers. The packet processors extract information from each packet to form a lookup key, which can be used to index or search a flow table (such a flow table component 1080). Once that packet processor finds a flow entry in the flow table, it can reference that entry to obtain information on how the packet should be serviced and which network interface it should be forwarded on.

FIG. 2 shows a representative flow table. Note that while functions such as a flow table in this example are implemented by means of discrete physical components, those functions can also be designed as software to be stored in memory and executed by a more general-function CPU. A flow entry in the flow table 1080 can associate the action and service profile for all packets whose flow key entry resolve to the same entry in that flow table. Fields in the flow table entry can indicate any service parameter relative to packet transmission services.

Because the flow table can include, for example, attributes of the source and the destination network address and applications or other attributes, a flow-based appliance can provide very granular service to packets in a communications exchange. The example flow table 2000 of FIG. 2 shows a partial list of flow entries for a source network address 171.12.16.1 communicating over TCP application port 80 (HTTP protocol for web) to a small list of destination host web servers in the Internet 192.168.1.1 to 192.168.1.5. Flow entries can be considered unidirectional so a specific source destination pair defines the unidirectional entry in the communications exchange. For example, flow entries 2080 and 2090 define the bi-directional communication exchange between host 171.12.16.1 to web server 192.168.1.1 to be allowed and to use a particular service 2075 profile, here called ProfileN. The flow entry also specifies the network interface. The case of denying web traffic to a particular web server from a specific source is shown in flow entries 2160 and 2170. Here the flow entry has an action 2070 attribute of Deny.

One aspect of a flow table without masking, is that each combination of source destination host addresses and application ports requires a specific flow entry to exist, which allows every instance of a communication exchange between hosts and applications to be given specific and granular service. However, in a large network with many hosts and applications, such as the Internet, the combination of hosts and applications that can communicate may be so large as to render it inefficient to scale a flow table to maintain entries for each communication flow.

FIG. 3 illustrates an exemplary address mask table 3000 in accordance with an embodiment of the present invention. An address mask table 3000 containing a network address 3010, a granularity mask 3020, and the result 3030 are referenced in setting the address value for forming a flow key. The addresses contained in this table define how specific networks and hosts should be given granular flow service or a flow service that multiple flows can match. The address 3010 can be used to specify a specific or partial network address for finding which address mask entry to be used in processing a network address for forming a flow key. A convenient lookup or search algorithm for this table is a longest prefix match, which can be used to search the table with a specific network address.

A granularity mask 3020 is a bit-value mask used to perform a logical AND operation on the bits in the network address using the bits in the granularity mask. The logical AND operation can compare 2 bits. If both of the two bits have a value of "1," then the result is "1." Otherwise, the result is "0."

The results of the logical AND operations can provide the bits that remain "1" in the network address, whose result 3030 gives the result value to use in forming the flow key for a flow lookup. A mask of all "1s" would result in the flow key using the full network address; otherwise a portion of the bits would be used. Because a network address includes network and subnet identifiers, a bit mask can be used to form a flow key that is re-used for all addresses on a subnet or network level. In essence, this table gives the packet processor a "substitution" value to use for the address portions of the flow key. By supplying a partial match entry (any mask value that is not all "1s"), multiple hosts or networks can substitute their specific host network addresses for a non-specific network host address.

The use of a granularity mask 3020 will be explained with reference to the following example. This example is merely illustrative of the use of the granularity mask 3020. Other implementations will occur to those skilled in the art. In address mask table entry 3060, the network address 7.8.9.10 (3060, 3010) is specified with a mask that has all bits in the mask set to 11111111.11111111.11111111.11111111 (hexadecimal FF.FF.FF.FF) (3060, 3020) so that logical ANDing these values result in a specific host network 7.8.9.10 (3060, 3030) address to use in the flow key. In address mask table entry 3050, the network address 192.168.0.0 (3050, 3010) is specified with a mask that has no bits in the mask set 00000000.00000000.00000000.00000000 (hexadecimal 00.00.00.00) (3050,3020) so that logical ANDing these values result of all zeros for the result address 0.0.0.0 (3050, 3030). This means that for every address in the 192.168 network with active communication exchanges will result in the packet processors using a value of 0.0.0.0 in the formation of that address portion of the flow key.

FIG. 4 is an example of an application port mask table 4000. An application port mask table 4000 contains an application port 4010, a granularity mask 4020, and the result 4030 to be used in setting the application port value for forming a flow key. The application ports contained in this table define how specific applications can be given granular flow service or a flow service that multiple application flows can match and re-use. The application port 4010 is used to specify a specific application port for finding which application port mask entry is used to process an application port. It is likely that a simple index table could be used to search the table with a specific application port value. The granularity mask 4020 is a bit-value mask used to logical AND bits in the application port, whose result 3030 gives the result value to use in forming the flow key for a flow lookup. This table can give a packet processor a "substitution" value to use for the application port portions of the flow key. Specific ports can provide granular application flow definition for flow lookups and unspecified ports can default to a value of all zeros resulting in multiple application ports re-using the same application port value as part the flow key. That sort of reuse in turn results in the application ports sharing the same flow entries as depicted in entry 4050.

FIG. 5 is an example of a flow table with masking. An example flow table 5000 using the substitute values from the masking tables having been used to form the flow entries is shown. In this table the flow key can be the combination of inbound interface 5010, source IP address 5020, destination IP address 5030, source application port 5040, and destination application port 5050. The remaining fields in the flow entry can comprise the outbound interface 5060, action 5070, and the service 5080 to provide packets matching the flow key. This example table demonstrates the effective scaling of the flow table for all network host traffic. Instead of having a flow table for all combinations of hosts and applications in the network, this particular flow table re-uses the same unidirectional flow entry for all hosts in the 171.12.16 subnet shown in flow entries 5080 and 5090. In a further aspect, the flow table can reuse a flow entry for all other hosts not on the 171.12.16 subnet shown in flow entries 5100 and 5110. In flow entry 5080, the flow entry will be used for all packets received on interface 1 (5080, 5010) from any network host source address on the 171.12.16 subnet (5080, 5020) destined to any host 0.0.0.0 (5080, 5030) for the application communication port TCP:80 (5080, 5050). As an example, all network hosts on the 171.12.16 subnet can communicate to any web server (port 80) on the Internet. All of the communications that use this flow entry will receive a service profile of ProfileN and will be transmitted out interface 2. Because communication exchanges are typically bi-directional, a flow entry for the return communication exchange is depicted in flow entry 5090. Here, the flow entry will be used for all packets received on interface 2 (5090, 5010) from any network host source address on the Internet 0.0.0.0 (5080, 5020) destined to any host on the 171.12.16 subnet (5080, 5030) for the application communication port TCP:80 (5080, 5040). As an example, any web server (port 80) on the Internet is allowed communication to any network host on the 171.12.16 subnet. All of the communications that use this flow entry can receive a service profile of ProfileM and will be transmitted out interface 1. It is often useful to have a different transmission service given to packets in each direction of their communications.

Figure 6:
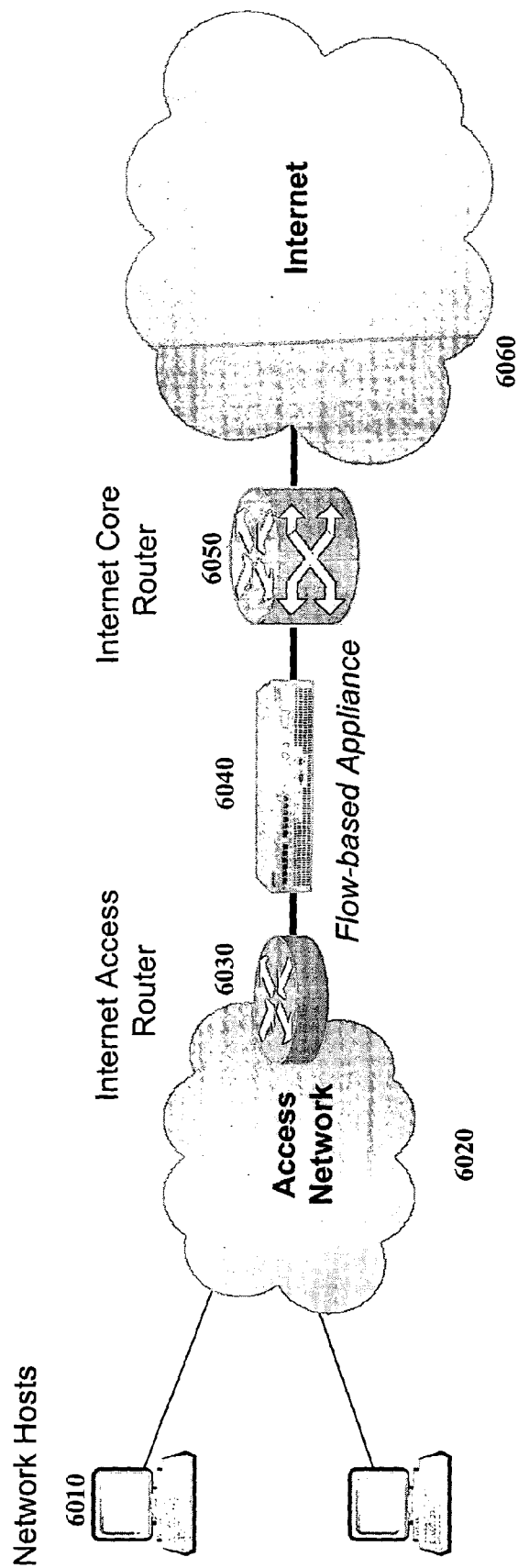
FIG. 6 is a network placement example.

FIG. 6 is a network placement example. A typical network placement is shown for the flow-based network appliance apparatus described herein. Network hosts 6010 can be connected to an access network 6020 to an Internet access router 6030. In turn, the Internet access router can be connected to the flow-based network appliance 6040, which can provide scaleable flow-based application and subscriber traffic control for all communication flows. The flow-based network appliance can be connected to an Internet Core Router 6050, which can provide direct access to the Internet 6060. A placement of this nature allows a network access provider to have granular, uni-directional service control over all network host and application communications originating from or detonated to the network hosts in the access network.

Figure 7:
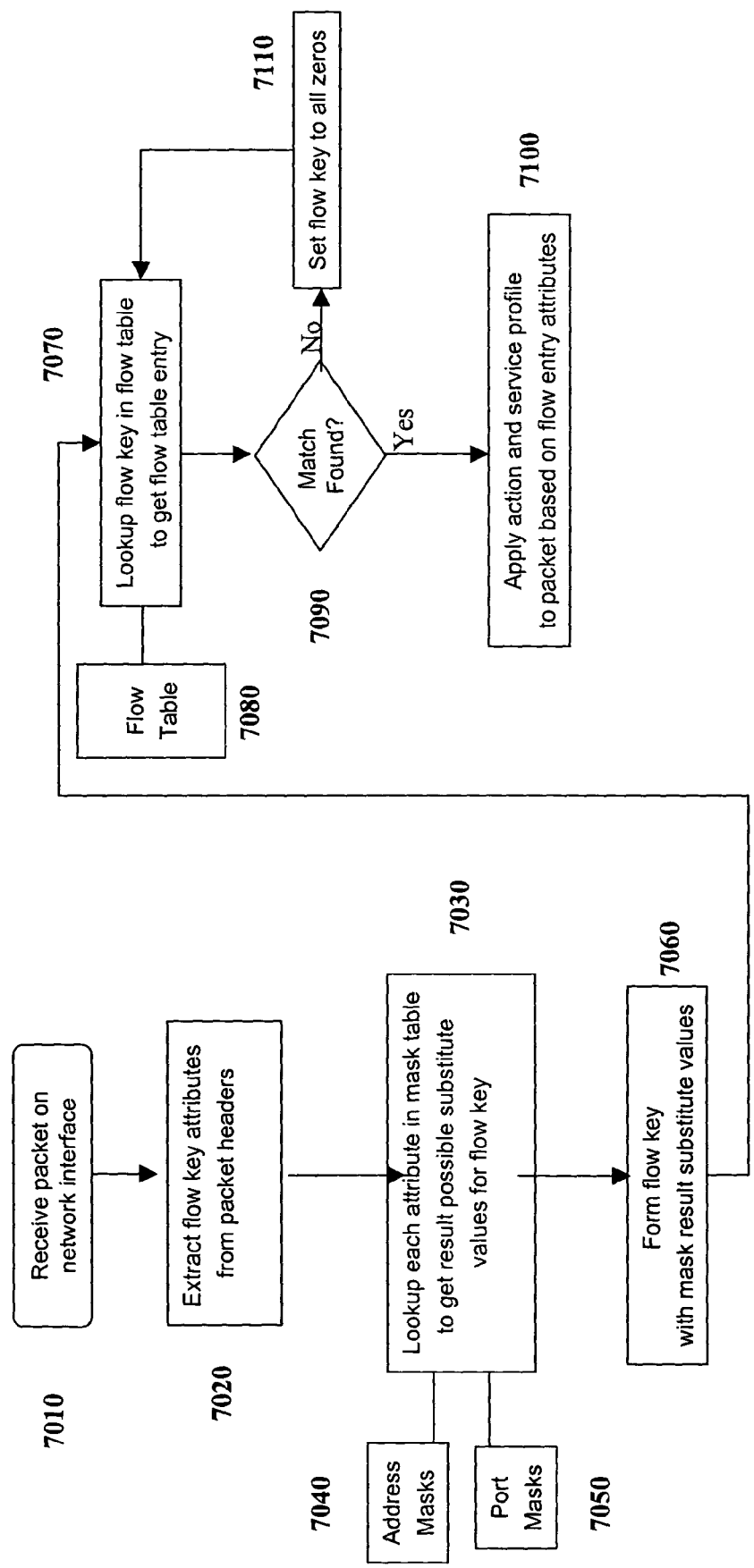
FIG. 7 is a flow diagram depicting the method of applying mask to flow keys for lookups in packet processing and forward.

FIG. 7 shows a flow diagram of a manner of scaleable flow-based traffic control under the present invention. In step 7010, the network interface 1110 receives a packet on a network interface and in step 7020 can extract flow key attributes from the packet headers to be used for forming the flow key used to lookup a match in the flow table. In step 7030, the packet processor 1090 can look up each attribute from the received packet headers needed to form the flow key in their respective masking tables to get result values to substitute in the key formation. Each network address attribute from the packet is used to search address mask table 7040 and each application communication port extracted from the received packet is used to search Port Masks 7050. In step 7060, the flow key is formed using the mask result substitute values and in step 7070 this newly formed key is used to lookup a matching flow entry in the Flow Table 7080. In step 7090, if a flow entry match is found, then the apparatus can apply the action and service profile specified in the flow entry to the packet in step 7100. In step 7090, if a flow entry match is not found, then the flow key can be cleared (set to all zeros) in step 7110 and step 7070 can be repeated for the purpose of finding the default flow entry for any flows that do not match a specified entry.

It is understood that the embodiments described hereinabove are merely illustrative and are not intended to limit the scope of the invention. Other implementations will occur to those skilled in the art. For example, method and apparatus could be for any attribute in an end-end-communications flow between nodes on a network and could be implemented in a variety of apparatuses, including but not limited to, software operating on a host system or machine. It is realized that those skilled in the art can make various changes, alterations, rearrangements and modifications without substantially departing from the spirit and scope of the present invention.

We claim:

1. A method for transmitting data in an IP network comprising:
   receiving, by an appliance having a processing unit, a data transmission in the IP network;
   extracting a source address, a destination address, and at least one port from a header of the data transmission;
   looking up the source address and the destination address in an address mask table and determining a most granular bit-value mask by finding a longest prefix match corresponding to each of the source address and the destination address to obtain address result values, the address mask table having a plurality of bit-value masks wherein the plurality of bit-value masks have a plurality of granularities;
   looking up the at least one port in a port mask table to obtain port result values;
   forming a source and destination and port flow key based on the address result values and the port result values;
   looking up a flow key in the a source and destination and port flow key table to find a corresponding flow entry; and
   if the flow entry indicates to deny the data transmission, blocking the data transmission, otherwise transmitting the data transmission in the IP network with a service profile specified by the flow entry;
   if no bit-value mask in the address mask table corresponds to the source address or the destination address, no mask is applied to the source address or the destination address.

2. The method according to claim 1, further comprising:
   if no flow entry corresponds to the formed flow key, a default value is used for the flow entry.

3. The method according to claim 1, further comprising:
   entering a bit-value mask in the mask table by a service provider.

4. The method according to claim 1, wherein the bit-value mask in the mask table corresponds to a range of a plurality of subscribers to a service.

5. The method according to claim 4, wherein the plurality of subscribers includes at least one selected from a group consisting of network hosts and a sub-network.

6. The method according to claim 1, wherein the bit-value mask corresponds to at least one network application.

7. The method according to claim 1, wherein the flow entry includes transmission information.

8. The method according to claim 7, wherein the transmission information includes at least one selected from a group consisting of application specific qualities and service specific qualities.

9. The method according to claim 8, wherein the transmission information includes at least one selected from a group consisting of policy, quality of service, and latency.

10. A system for transmitting data comprising:
    a processing unit;
    a receiving unit configured to receive a data transmission in an IP network;
    an extraction unit configured to extract field a source address, a destination address, and at least one port from a header of the data transmission;
    a mask table including a plurality of bit-value masks, wherein the plurality of bit-value masks include a plurality of granularities;
    a masking unit configured to determine a most granular bit-value mask finding a longest prefix match corresponding to each of the source address and the destination address and finding a match for the port and output a masked flow key based on the matches;
    a flow table indexed with reference to the masked flow key; and
    a transmitter configured to transmit the data transmission in an IP network according to a flow entry in the flow table corresponding to the masked flow key of the data transmission.

11. The method according to claim 10, wherein the bit value mask is configured to allow at least one bit-value mask to be entered by a service provider.

* * * * *

UNITED STATES PATENT AND TRADEMARK OFFICE
CERTIFICATE OF CORRECTION

| | | |
|---|---|---|
| PATENT NO. | : 7,743,166 B2 | Page 1 of 1 |
| APPLICATION NO. | : 10/673999 | |
| DATED | : June 22, 2010 | |
| INVENTOR(S) | : Kurt A. Dobbins et al. | |

It is certified that error appears in the above-identified patent and that said Letters Patent is hereby corrected as shown below:

In Column 9, claim 1, line 56, after "key in" delete "the" and line 57 after "flow" delete "key."

In Column 10, claim 10, line 37, after "extract" delete "field", and line 44, after "mask" insert --by--.

Signed and Sealed this

Twenty-eighth Day of September, 2010

David J. Kappos
*Director of the United States Patent and Trademark Office*